Patented Jan. 2, 1951

2,536,986

UNITED STATES PATENT OFFICE 2,536,986

THIAZOLONE CYANINE DYES AND THE METHOD OF PREPARING THE SAME

Thomas R. Thompson and Lee C. Hensley, Binghamton, N. Y., assignors to General Aniline & Film Corporation, New York, N. Y., a corporation of Delaware No Drawing. Application November 18, 1947, Serial No. 786,814

16 Claims. (Cl. 260—240.4)

This invention relates to thiazolone cyanine dyes and to a method of preparing the same.

One of its objects is a process of manufacturing thiazolone cyanine dyes which are suitable for sensitizing a silver-halide emulsion and as intermediates for the manufacture of tri-nuclear cyanine dyestuffs.

Another object is the thiazolone cyanine dyes.

Further objects will be evident from the detailed specification following hereafter.

We have found that thiazolone cyanine dyes can be obtained by condensing a substituted thioamide with an α-halogen or α-dihalogen acetic acid or with an α-halogen propionic acid. The condensation reaction may be effected by simply fusing the co-reactants, or by heating them in a suitable solvent at a temperature ranging from 75° C. to 120° C. for a period of 5 to 60 minutes. The dyestuffs obtained are characterized by the following general formula:

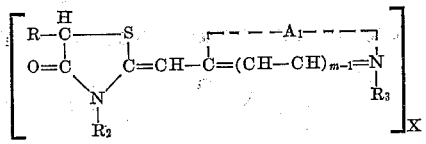

wherein $A_1$ represents the residue of a heterocyclic nitrogenous nucleus of the type common in cyanine dyes, e. g., oxazole, thiazole, selenazole, and their polycyclic homologues, such as those of the benzene, naphthalene, acenaphthene and anthracene series, pyridine and its polycyclic homologues, such as quinoline and α- or β-naphthaquinolines, indolenines, benzimidazoles, diazines, such as pyrimidines and quinazolines, thiazolines and selenazolines. The polycyclic compounds of this series may also be substituted in the carbocyclic rings with one or more groups such as alkyl, i. e., methyl, ethyl, etc., aryl, i. e. phenyl, or amino, hydroxy, alkoxy, i. e., methoxy, ethoxy, etc., and methylene-dioxy groups, or by halogen, i. e., chlorine, bromine, or iodine atoms, $m$ represents 1 or 2; R represents hydrogen, a halogen, e. g., chlorine, bromine or iodine, or a methyl group, $R_2$ represents an alkyl, allyl, aryl or aralkyl group, e. g., methyl, ethyl, propyl, phenyl, naphthyl, tolyl, benzyl, and the like, $R_3$ represents an alkyl or aralkyl group or substituted groups of this type, e. g., methyl, ethyl, propyl, butyl, hydroxyethyl, ethoxyethyl, naphthylmethyl, benzyl, and the like, and X represents an acid radicle, e. g., chloride, bromide, iodide, or alkyl sulfate, alkyl p-toluenesulfonate or perchlorate.

The preparation of the substituted thioamides is carried out according to the method of Schneider et al. (Ber. 57, 522–532), which consists of condensing a heterocyclic quaternary ammonium salt, of the type commonly employed in cyanine dye synthesis and containing a reactive methyl group in α- or β-position to the ring nitrogen atom thereof, with an alkyl-, allyl-, aryl- or aralkyl ester of isothiocyanic acid in the presence of a base such as triethylamine or pyridine. The reaction is believed to take place as follows:

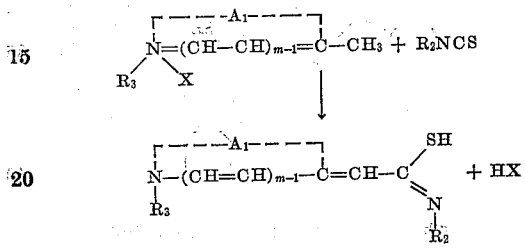

where $A_1$, $m$, $R_2$, $R_3$ and X have the same values as above.

As typical examples of heterocyclic quaternary ammonium salts, the following may be mentioned: 2-methylbenzothiazole ethiodide, 2-methylbenzoxazole ethiodide, 2-methylbenzoselenazole methiodide, 2-methylpyridine ethiodide, 2-methylquinoline ethiodide, 2-methylthiazoline ethiodide, 2-methyl α- or β-naphthothiazole ethiodide, and the like.

The following are examples of suitable esters of isothiocyanic acid: methyl, ethyl, butyl, isoamyl or isopropyl ester, phenyl, o-tolyl or xenyl ester, allyl or benzyl ester. Phenyl isoselenocyanate may also be employed.

The condensation reaction between the substituted thioamide and an α-halogen acetic acid, α-dihalogen acetic acid or with an α-halogen propionic acid, represented by the following formula:

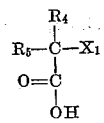

wherein $R_4$ represents hydrogen or a methyl group, $R_5$ represents hydrogen or halogen, e. g., chlorine, bromine or iodine, and $X_1$ represents a halogen of the same value as given for $R_5$, is carried out by simply heating the co-reactants in a bomb or sealed tube at a temperature ranging from 100° to 120° C. for three to six hours. The reaction can also be effected by heating the co-reactants in the presence of an alcohol or acetic acid or anhydride for a few minutes, at reflux, or on the steam bath. We prefer, however, to operate by heating the co-reactants in the presence of methyl, ethyl, propyl, isopropyl, butyl, amyl, isobutyl alcohol and the like, acetic acid or acetic anhydride at a temperature ranging from 75° to 120° C. for a period of five to sixty minutes.

The reaction involved, while utilizing α-halogen acetic acid, is believed to take place as follows:

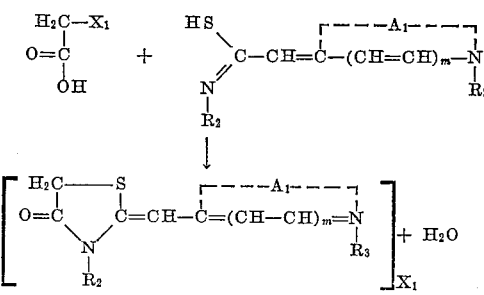

The following examples describe the preparation of some of the substituted thioamides, which are, as shown hereinafter, converted to thiazolone cyanine dyes.

*Example I*

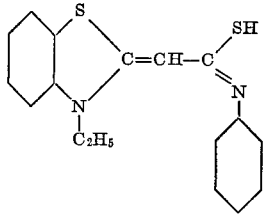

α-(3-ethylbenzothiazolylidene) thioacetanilide

A mixture of 60 grams of 2-methylbenzothiazole and 100 grams of ethyl p-toluenesulfonate was heated gradually to 195° C., at which point an exothermic reaction took place, and the mixture held at 195° C. for five minutes. After cooling to 100° C., the product was poured into a solution of 85 cc. of phenyl isothiocyanate in 250 cc. of pyridine. The resulting mixture was stirred and heated at 120° C. for ten minutes, cooled to room temperature, and diluted with 1 liter of ice water. After decanting the water from the heavy oil, washing again with 0.5 liter of water, and decanting the water, the oil was rubbed with 200 cc. of methanol until it solidified. This crude solid was boiled out with 300 cc. of isopropanol, filtered and dried in an oven at 80° C. A yield of 96.5 grams of a yellow-orange product was obtained which melts at 195° C. An additional 12.5 grams of the product was obtained by concentrating and chilling the mother liquor. The total yield was 109 grams.

*Example II*

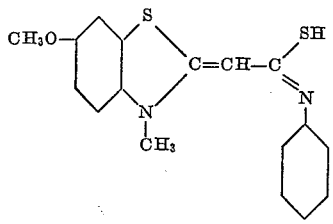

α-(3-methyl-6-methoxybenzothiazolylidene) thioacetanilide 12.5 grams of 2-methyl-6-methoxybenzothiazole methyl p-toluenesulfonate were dissolved in 20 cc. of methanol, 6 cc. of phenyl isothiocyanate and 4 cc. of triethylamine were added and the mixture allowed to stand for 12 hours. 60 cc. of water were added and the mixture stirred. The water was decanted from the heavy oil, and the oil boiled out with 50 cc. of methanol. After cooling, the product was filtered and washed with methanol. A yield of 6.45 grams of a yellow solid, melting at 199–200° C., was obtained.

*Example III*

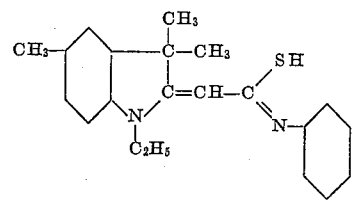

α-(1-ethyl-3,2,5-trimethyl-indolinylidene) thioacetanilide 12.5 grams of 2,3,3,5-tetramethylinodolenine ethiodide were dissolved in 20 cc. of methanol. 4 cc. of triethylamine and 6 cc. of phenyl isothiocyanate were added to the solution, and the mixture allowed to stand for 48 hours. 60 cc. of ether were added and the flask chilled in an ice bath. A small amount of the starting ethiodide salt was removed by filtration, and the filtrate was evaporated on a steam bath. 6.9 grams of the final product remained as a thick orange residue.

*Example IV*

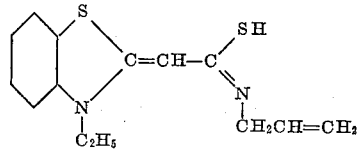

α-(3-ethylbenzothiazolylidene) N-allylthioacetamide 7.7 cc. of allyl isothiocyanate and 25.07 grams of 2-methylbenzothiazole ethyl p-toluenesulfonate were heated with 35 cc. of pyridine at 120° C. for ten minutes. After stirring the mixture with water and decanting, then stirring with ether and decanting, the solid was filtered and dried at 80° C. A yield of 3.5 grams of dark crystals was obtained.

*Example V*

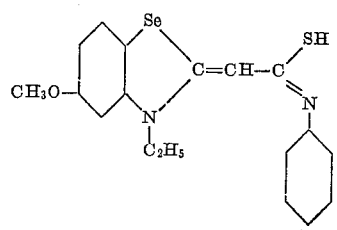

α-(3-ethyl-5-methoxybenzoseleneazolylidene) thioacetanilide 3 cc. of phenyl isothiocyanate and 7.1 grams of 2-methyl-5-methoxybenzoselenazole ethiodide in 15 cc. of pyridine were boiled for five minutes. After cooling, 35 cc. of ether were added. The mixture was stirred and allowed to stand for one hour. A precipitate formed which was filtered and washed with water. The solid was boiled out with 50 cc. of isopropanol, cooled to room temperature, filtered, and dried at 80° C. The yield was 4.19 grams, melting at 233–234° C.

Example Va

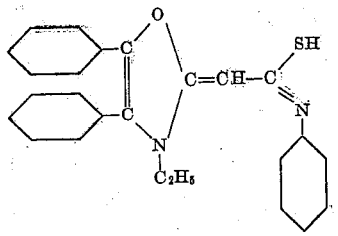

α-(3-ethyl-4,5-diphenyloxazolylidene)thioacetanilide

A mixture of 7.8 grams of 2-methyl-4,5-diphenyloxazole ethiodide, 2.7 grams of phenylisothiocyanate, 10 grams of pyridine, and 2 grams of triethylamine was dissolved by gentle warming, and the resulting solution allowed to stand at room temperature for ten days. The reaction mixture was diluted with 150 cc. of water and stirred until the product solidified. The material was purified by washing with water and grinding with isopropyl alcohol. The yield was 2.7 grams, melting at 144–5° C.

Example Vb

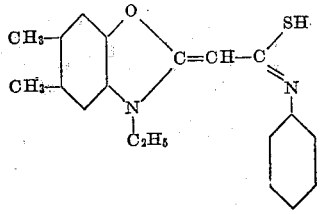

α-(3-ethyl-5,6-dimethylbenzoxazolylidene)thioacetanilide

A mixture of 31.7 grams of 2,5,6-thrimethylbenzoxazole ethiodide, 13.5 grams of phenylisothiocyanate, 17.9 grams of pyridine and 10.1 grams of triethylamine was gently warmed and stirred to effect solution. After standing at 25° C. for ten days, the mixture was diluted with 300 cc. of water and washed with water by decantation. The resulting semisolid was dissolved in the minimum amount of hot isopropyl alcohol and, after cooling, three volumes of ether added. The bright yellow solid was dried at 80° C. The yield was 11 grams, melting at 172–5° C.

Example VI

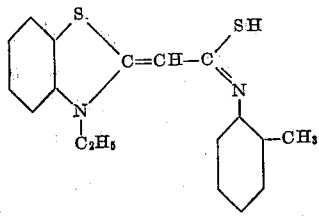

α-(3-ethylbenzothiazolylidene) thioacet-o-toluide

This procedure is essentially that of Example I except that 6 grams of 2-methylbenzothiazole, 10 grams of ethyl p-toluenesulfonate, and 8.5 cc. of o-tolyl isothiocyanate were used. The yield was 6.22 grams of a solid that melts at 198–200° C.

Example VII

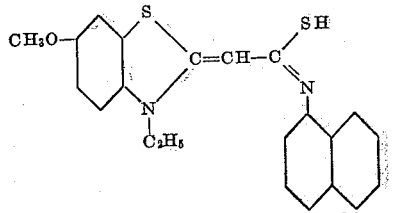

α-(3-ethyl-6-methoxybenzothiazolylidene) thioacet-α-naphthalide 5.2 grams of 2-methyl-6-methoxybenzothiazole ethyl p-toluenesulfonate and 2.2 grams of α-naphthyl isothiocyanate in 12 cc. of pyridine were heated at 110° C. for ten minutes with stirring. After cooling to room temperature and chilling with ice water, the solid was treated with 20 cc. of methanol and filtered. The residue was boiled with 25 cc. of isopropanol, cooled, filtered and dried at 80° C. A yield of 1.9 grams was obtained which melts at 200–210° C.

Example VIII

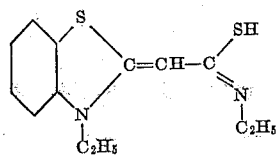

α-(3-ethylbenzothiazolylidene)-N-ethylthioacetamide 6 grams of 2-methylbenzothiazole ethiodide, 2 cc. of ethyl isothiocyanate, 10 cc. of pyridine, and 1 cc. of triethylamine were refluxed (wax-bath temperature 140° C.) for twenty minutes. After pouring into 400 cc. of water, the mixture was allowed to stand for 48 hours. A red gummy solid separated. This product was filtered and stirred with isopropanol. The resulting red crystals were filtered, dried at 80° C. to yield 1.5 grams, melting at 126–131° C.

Example IX

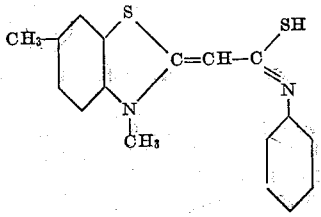

α-(3,6-dimethylbenzothiazolylidene) thioacetanilide 20 grams of phenyl isothiocyanate, 38.8 grams of 2-methylbenzothiazole methosulfate and 40 cc. of pyridine were refluxed for one hour, and the mixture poured into water. After standing, the water was decanted, and the solid boiled out with isopropanol. The mixture was cooled, filtered, and dried at 80° C. A yield of 25.85 grams, melting at 188–190° C. was obtained.

Example X

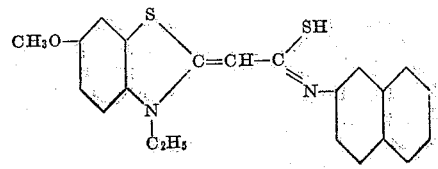

α-(3-ethyl-6-methoxybenzothiazolylidene) thioacet-β-naphthalide 5 grams of 2-methyl-6-methoxybenzothiazole methyl p-toluenesulfonate, 2 grams of β-naphthyl isothiocyanate and 12 cc. of pyridine were heated together at 110° C. for ten minutes with stirring. This mixture was added to ice water and stirred until a sticky solid formed. The water was decanted, the solid treated with 20 cc. of methanol, and filtered. The residue was boiled out with isopropanol, cooled, filtered, and dried at 80° C. The yield was 1.4 grams of a solid, melting at 167–169° C.

Example XI

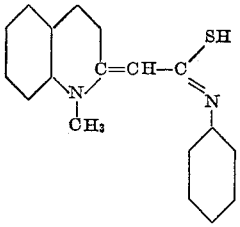

α-(1-methyl-2-quinolylidene)thioacetanilide

A mixture of 50 grams of quinaldine methyl p-toluenesulfonate, 25 grams of phenyl isothiocyanate, 20 grams of triethylamine and 80 cc. of pyridine was heated to boiling and allowed to stand overnight. The mixture was diluted with ether and a dark brown solid separated which was purified by washing with methanol. A yield of 21 grams was obtained, melting point 163–169° C.

Example XII

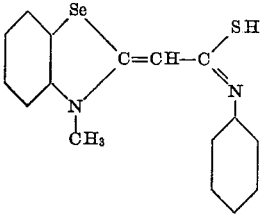

α-(3-methylbenzoselenazolylidene)thioacetanilide

A mixture of 17 grams of 2-methylbenzoselenazole methyl p-toluenesulfonate, 11 grams of phenyl isothiocyanate, and 20 cc. of pyridine was treated, as in Example XI, to yield 14 grams of orange colored crystals.

Example XIII

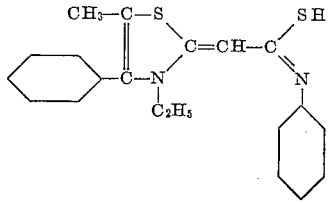

α-(3-ethyl-5-methyl-4-phenylthiazolylidene)thioacetanilide

A mixture of 10 grams of 2,5-dimethyl-4-phenylthiazole and 10.5 grams of ethyl p-toluenesulfonate was fused at 110° C. for ten minutes. The resulting quaternary salt was mixed with 9 grams of phenyl isothiocyanate, 10 cc. of pyridine and 2 grams of fused sodium acetate. After heating at 175° C. for five minutes, an orange-red color developed and the product was mixed with 200 cc. of water and washed by decantation. After stirring with 25 cc. of methanol, crystals formed. After filtering and washing with isopropanol, and finally with ether, 2 grams of orange crystals melting at 146–147° C. were obtained.

The following examples describe the preparation of thiazolone cyanine dyes from the foregoing substituted thioamides.

Example XIV

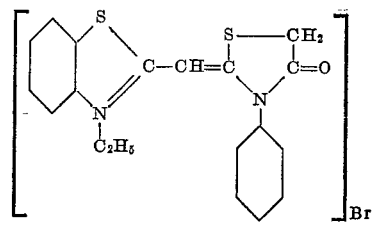

A mixture of 25 grams of α-(3-ethylbenzothiazolylidene) thioacetanilide (Example I) and 25 grams of bromacetic acid was heated in 50 cc. of n-butanol for ten minutes at 110° C., the solution becoming deep yellow in color. The mixture was cooled, stirred with ether, filtered, and washed with ether. The residue was dried at 80° C. to yield 34.9 grams of a solid, melting at 231–236° C. A ten gram fraction of this was recrystallized from methanol to yield 7.7 grams of the final dye, melting at 233–234° C.

Example XV

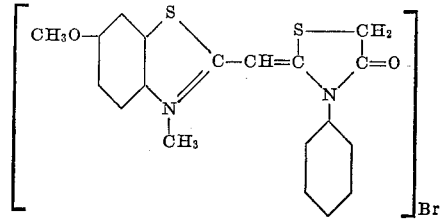

A mixture of 5 grams of α-(3-methyl-6-methoxybenzothiazolylidene) thioacetanilide (Example II) and 5 grams of bromacetic acid in 10 cc. of n-butanol was heated on a steam-bath with stirring for fifteen minutes, the solution becoming a yellow in color. The mixture was treated with a small quantity of ether, filtered, and washed with ether. The solid product was recrystallized from methanol to give 4.6 grams of dye crystals melting at 216–217° C.

Example XVI

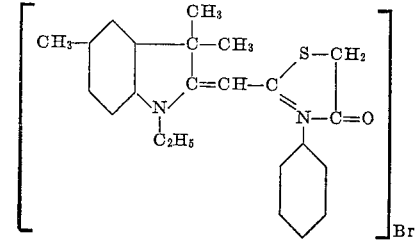

6.9 grams of α-(1-ethyl-3,3,5-trimethylindolinylidene) thioacetanilide (Example III) were heated with 6.9 grams of bromoacetic acid in 25 cc. of n-butanol at 105–110° C. for ten minutes. The mixture was treated with ether and the ether layer decanted. The black liquid was stirred with isopropanol and filtered. The residue was recrystallized from methanol to yield 1.7 grams of the final dye having a melting point at 236–238° C.

Example XVII

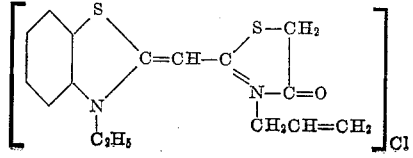

A mixture of 3.5 grams of α-(3-ethylbenzothiazolylidene) n-allylthioacetamide (Example IV), 3.5 grams of chloracetic acid, and 7 cc. of n-butanol was boiled for three minutes. After cooling, the product was precipitated with ether to yield 4.3 grams of crystals melting at 227–230° C.

*Example XVIII*

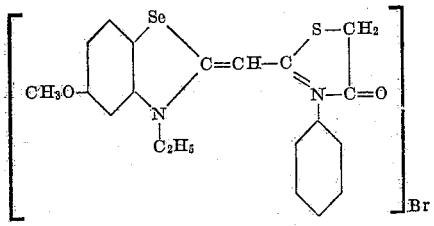

A mixture of 4.11 grams of α-(3-ethyl-5-methoxybenzoselenazolylidene) thioacetanilide (Example 5), 4.11 grams of bromactice acid, and 45 cc. of n-butanol was heated at 90° C. for twenty minutes and at 110° C. for ten minutes. The thick slurry of greenish crystals was thinned with three volumes of ether and filtered to yield 5.0 grams of a product, melting at 283–284° C.

*Example XIX*

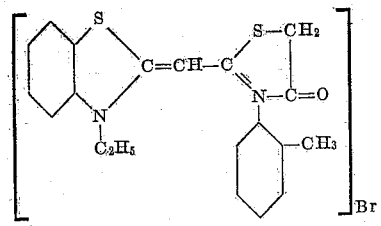

4 grams of α-(3-ethylbenzothiazolylidene) thioacet-o-toluide (Example 6), 4 grams of bromacetic acid, and 8 cc. of n-butanol were treated as in Example 14 to yield 3.9 grams of a thiazolone cyanine dye melting at 240–241° C.

*Example XX*

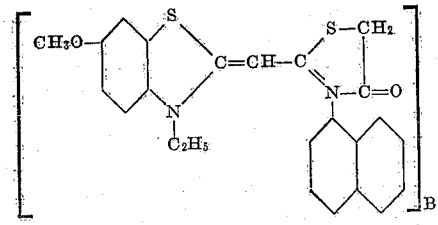

A mixture of 1.5 grams of α-(3-ethyl-6-methoxybenzothiazolylidene) thioacet-α-naphthalide (Example 7) was heated with an equal weight of bromoacetic acid in 5 cc. of n-butanol at 110° C. for five minutes. The yellow crystals, which separated on cooling, weighed 0.75 gram and melted at 201–203° C.

*Example XXI*

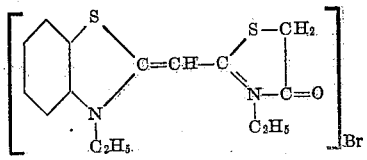

A mixture of 1.5 grams of α-(3-ethylbenzothiazolylidene)-N-ethylthioacetamide (Example 8), 1.5 grams of bromoacetic acid and 5 cc. of acetic acid was heated at 120° C. for five minutes. After cooling, the product was precipitated with ether and dried to yield 2.07 grams.

*Example XXII*

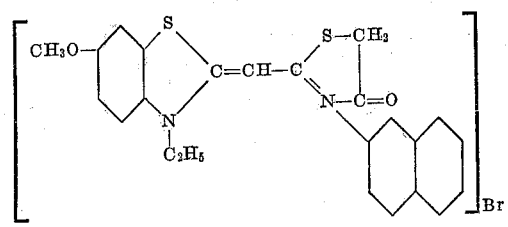

A mixture of 1.3 grams of α-(3-ethyl-6-methoxybenzothiazolylidene) thioacet-β-naphthalide (Example 10), 1.3 grams of bromoacetic acid and 5 cc. of n-butanol was heated at 110° C. for ten minutes. After precipitation with ether and crystallization from n-propyl alcohol, there were obtained 1.01 grams of crystals melting at 217–219° C.

*Example XXIII*

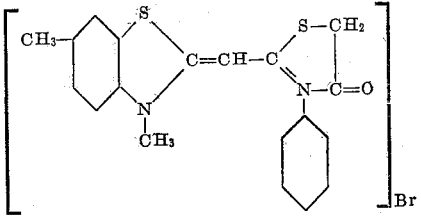

A mixture of 20 grams of α-(3,6-dimethylbenzothiazolylidene) thioacetanilide (Example 9), 20 grams of bromoacetic acid, and 25 cc. of n-butanol was heated at 110° C. for five minutes. The product was precipitated with ether and purified by boiling-out with isopropanol to yield 21.93 grams melting at 230–231° C.

*Example XXIV*

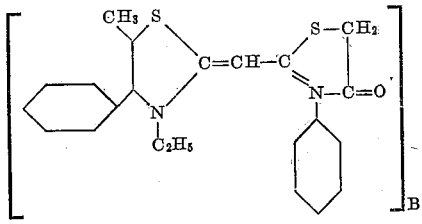

A mixture of 0.65 gram of α-(3-ethyl-5-methyl-4-phenylthiazolylidene) thioacetanilide (Example 13), 1.0 gram of bromoacetic acid, and 2 cc. of acetic acid was heated at 115° C. for one hour. The product was precipitated with ether and subsequently washed with ether by decantation. The viscous product does not solidify and may be used directly in dye synthesis.

*Example XXV*

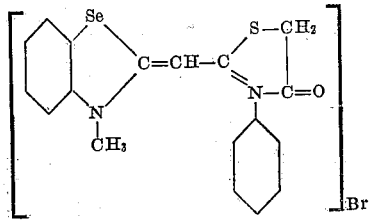

A mixture of 14 grams of α-(3-methylbenzoselenazolylidene) thioacetanilide (Example 12), 5.7 grams of bromoacetic acid, and 10 cc. of n-butanol was warmed on the steam bath for five minutes. The reaction mixture became thick, and after thinning with ether, the product was filtered to yield 13.0 grams melting at 266–272° C.

Example XXVI

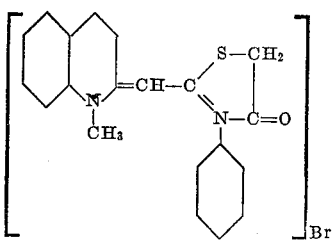

A mixture of 5.5 grams of α-(1-methyl-2-quinolylidene) thioacetanilide (Example 11) and an equal weight of bromoacetic acid was dissolved in 50 cc. of n-butanol and heated at 100° C. for ten minutes. On cooling, yellow crystals formed which were filtered and washed with ether. Recrystallization from methanol yielded yellow crystals melting at 212° C.

Example XXVII

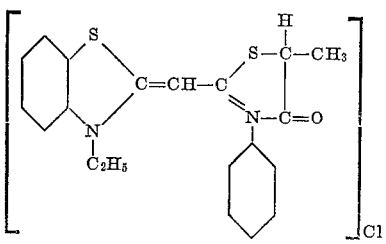

A mixture of 0.7 gram of α-chloropropionic acid, 0.7 gram of the product of Example 1, and 15 cc. of n-propyl alcohol was heated at reflux for ten minutes. The product separated on cooling and after recrystallization from n-propyl alcohol weighed 0.55 gram, melting at 198–199° C.

Example XXVIII

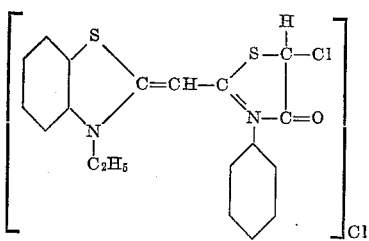

A mixture of 0.75 gram of dichloroacetic acid, 0.75 gram of the product of Example 1, and 15 cc. of n-propyl alcohol were treated as in Example 27 to yield 0.6 gram of dye, melting at 197–198° C.

Example XXIX

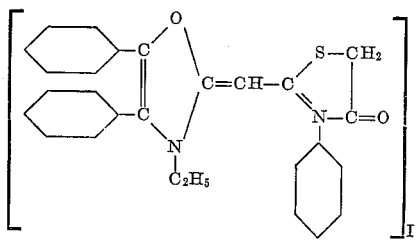

A mixture of 2.5 grams of α-(3-ethyl-4,5-diphenyloxazolylidene) thioacetanilide, 2.5 grams of bromoacetic acid, and 2.5 cc. of acetic acid was heated at 95° C. for thirty minutes. After cooling, the product was precipitated with ether and converted to the iodide by refluxing with 15 cc. of a saturated solution of sodium iodide in acetone. After cooling, an equal volume of ether was added and the light yellow crystals were filtered and washed with ether to yield 1 gram of final dye melting at 156–7° C.

Example XXX

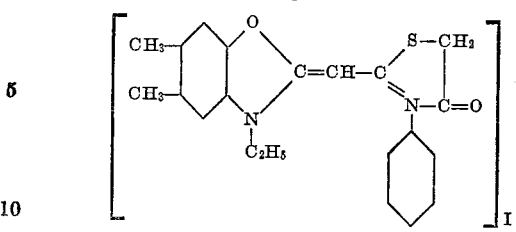

A mixture of 5 grams of α-(3-ethyl-5,6-dimethylbenzoxazolylidene) thioacetanilide, 5 grams of bromoacetic acid and 5 cc. of acetic acid was heated at 95° C. for thirty minutes. After cooling, the product was precipitated with ether. The semisolid precipitate was refluxed with 40 cc. acetone containing 5 grams of sodium iodide. After cooling, the light yellow product was filtered and dried at 80° C. to yield 3.5 grams of a solid which melts above 290° C.

The above dye salts may be converted to salts other than halogen by treating the halogen salt with an aqueous or aqueous-alcohol solution containing a sodium or potassium salt of perchloric or thiocyanic acid.

The foregoing thiazolone cyanine dyes may be employed as sensitizers for silver-halide emulsions. In the preparation of emulsions containing these dyes, the dye may be dissolved in methyl or ethyl alcohol and the alcoholic solution, containing from 3 to 50 milligrams of the dye, added to a liter of emulsion. The suitable and most economical concentration for any given emulsion will be apparent to those skilled in the art upon making the ordinary tests and observations used in the art of emulsion making.

The thiazolone cyanine dyes have an additional advantage in that they can be employed in the manufacture of light filters and anti-halation coatings. Moreover, the thiazolone cyanine dyes, which contain a methylene (=CH₂) group in the 5-position of the thiazole nucleus, can be utilized as intermediates in the preparation of trinuclear cyanine dyes according to the method disclosed in Application Serial No. 786,813 filed on November 18, 1947, now Patent No. 2,504,468, April 18, 1950. In general, the method consists of treating a cyclammonium quaternary salt of the type commonly employed in cyanine dye synthesis with a thiazolone cyanine dye in a suitable solvent such as an aliphatic alcohol in the presence of a basic condensing agent such as triethylamine or pyridine at room temperature for about 1 hour or by warming the reaction mixture on the steam bath for a few minutes.

While there have been pointed out above certain preferred embodiments of the invention, the same is not limited to the foregoing examples, illustrations or to the specific details given therein, but is capable of variations and modifications as to the reactants, proportions and conditions employed.

We claim:

1. Thiazolone cyanine dyes characterized by the following general formula:

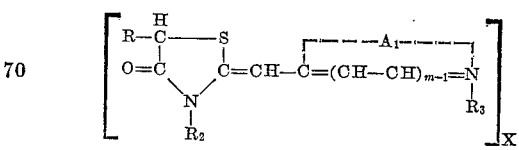

wherein $A_1$ represents the residue of a heterocyclic nitrogenous nucleus, of the type common in cyanine dyes, $m$ represents an integer from 1 to 2, R represents a member selected from the group consisting of hydrogen, halogen and methyl group, $R_2$ represents a member selected from the class consisting of alkyl, allyl, aryl and aralkyl groups, $R_3$ represents a member selected from the class consisting of alkyl and aralkyl groups, and X represents an acid radical.

2. A thiazolone cyanine dye having the following formula:

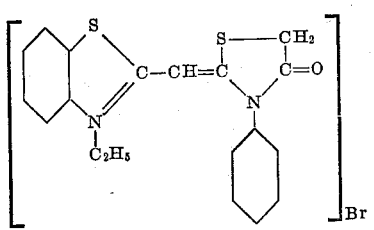

3. A thiazolone cyanine dye having the following formula:

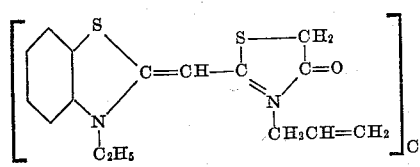

4. A thiazolone cyanine dye having the following formula:

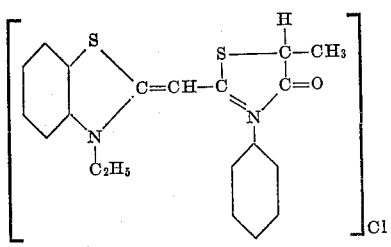

5. A process for the production of thiazolone cyanine dyestuffs which comprises heating a compound of the general formula:

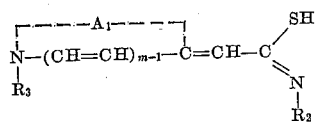

with a compound corresponding to the following formula:

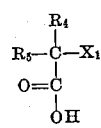

wherein $A_1$ represents the residue of a heterocyclic nitrogenous nucleus, of the type common in cyanine dyes, $R_2$ represents a member selected from the class consisting of alkyl, allyl, aryl and aralkyl groups, $R_3$ represents a member selected from the class consisting of alkyl and aralkyl groups, $R_4$ represents a member selected from the class consisting of hydrogen and methyl group, $R_5$ represents a member selected from the class consisting of hydrogen and halogen, $m$ represents an integer from 1 to 2, and $X_1$ represents a halogen selected from the group consisting of bromine, chlorine and iodine.

6. A process for the production of a thiazolone cyanine dyestuff which comprises heating a compound of the formula:

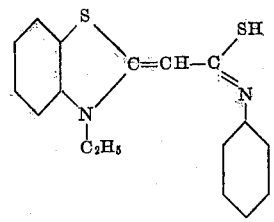

with bromacetic acid.

7. A process for the production of a thiazolone cyanine dyestuff which comprises heating a compound of the formula:

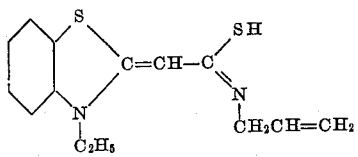

with chloroacetic acid.

8. A process for the production of a thiazolone cyanine dyestuff which comprises heating a compound of the formula:

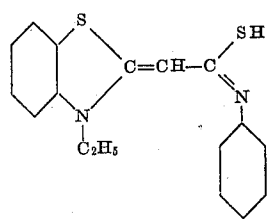

with α-chloropropionic acid.

9. The process according to claim 5 wherein the heating is conducted on the steam bath.

10. The process according to claim 7 wherein the heating is conducted in the presence of an aliphatic alcohol at a temperature ranging from 100–120° C.

11. The process according to claim 6 wherein the heating is conducted on a steam bath.

12. The process according to claim 7 wherein the heating is conducted by boiling in the presence of n-butanol for several minutes.

13. The process according to claim 8 wherein the heating is conducted at reflux.

14. A cyanine dye having the following formula:

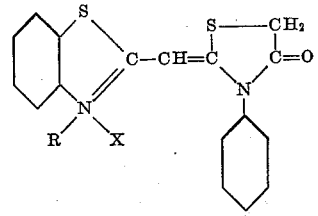

X represents an acid radical and R represents lower alkyl.

15. A thiazolone cyanine dye having the following formula:

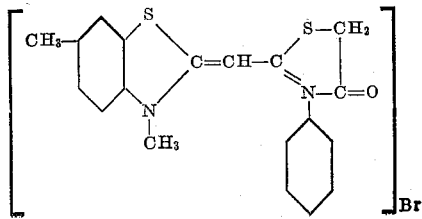

16. A thiazolone cyanine dye having the following formula:
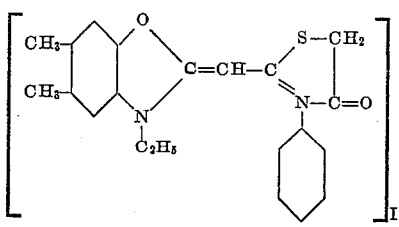
THOMAS R. THOMPSON.
LEE C. HENSLEY.
REFERENCES CITED
The following references are of record in the file of this patent:
UNITED STATES PATENTS
| Number | Name | Date |
|---|---|---|
| 2,153,931 | Barent | Apr. 1, 1939 |
| 2,264,870 | Beaver | Dec. 2, 1941 |
| 2,265,907 | Kendall | Dec. 9, 1941 |